United States Patent [19]

Lausberg et al.

[11] Patent Number: 5,331,044
[45] Date of Patent: Jul. 19, 1994

[54] LOW TEMPERATURE IMPACT RESISTANT, EASILY FLOWING, THERMOPLASTIC POLYURETHANE ELASTOMER COMPOSITIONS, A PROCESS FOR THEIR PREPARATION AND THEIR USE

[75] Inventors: Deitrich Lausberg, Ludwigshafen; Rolf Steinberger, Schifferstadt; Walter Heckmann, Weinheim; Harald Schulz, Vechta, all of Fed. Rep. of Germany

[73] Assignee: BASF Aktiengesellschaft, Ludwigshafen, Fed. Rep. of Germany

[21] Appl. No.: 477,034

[22] Filed: Feb. 7, 1990

[30] Foreign Application Priority Data

Feb. 7, 1989 [DE] Fed. Rep. of Germany ....... 3903537

[51] Int. Cl.$^5$ .......................... C08J 5/04; C08K 3/00; C08K 5/00; C08L 75/00
[52] U.S. Cl. ................................. 524/871; 524/590; 524/872; 524/873; 525/457; 525/458
[58] Field of Search ................ 525/457, 458; 524/590, 524/871, 872, 873

[56] References Cited

U.S. PATENT DOCUMENTS

| | | | |
|---|---|---|---|
| 3,736,272 | 5/1973 | Mosso et al. | 524/590 |
| 4,129,611 | 12/1978 | Heiss | 525/458 |
| 4,530,977 | 7/1985 | Lewarchik et al. | 524/457 |

FOREIGN PATENT DOCUMENTS

| | | | |
|---|---|---|---|
| 012414 | 6/1980 | European Pat. Off. | C08L 75/94 |
| 0111682 | 6/1984 | European Pat. Off. | C08L 75/04 |
| 2021603 | 5/1979 | United Kingdom | C08L 75/04 |

*Primary Examiner*—Paul R. Michl
*Assistant Examiner*—U. K. Rajguru
*Attorney, Agent, or Firm*—Dennis V. Carmen

[57] ABSTRACT

The present invention deals with low temperature impact resistant, easily flowing, thermoplastic polyurethane elastomer compositions, comprising:

A) 5–95 parts by weight of at least one thermoplastic polyurethane elastomer (A) having a Shore A hardness less hah 95; and B) 95–5 parts by weight of at least one thermoplastic polyurethane elastomer (B) having a Shore A hardness greater than 98, whereby the parts by weight of (A) and (B) total 100 parts by weight; and C) 0–60 weight percent based on the weight of (A) and (B) of a reinforcing filler.

The products are prepared by melting together polyurethane elastomers (A) and (B) at temperatures of from 140°–250° C., preferably in an extruder, and are most preferred for the preparation of ski boots and injection molded articles for motor vehicles.

12 Claims, No Drawings

LOW TEMPERATURE IMPACT RESISTANT, EASILY FLOWING, THERMOPLASTIC POLYURETHANE ELASTOMER COMPOSITIONS, A PROCESS FOR THEIR PREPARATION AND THEIR USE

BACKGROUND OF THE INVENTION

1. Field of the Invention

The present invention relates to low temperature impact resistant, easily flowing, thermoplastic polyurethane elastomer compositions comprising a mixture of thermoplastic polyurethane elastomers (A) and (B) having different hardnesses, and optionally reinforcing fillers, and a process for their preparation and their use.

2. Description of Related Art

Thermoplastic polyurethane elastomers, henceforth abbreviated TPU, are well known. Their technical significance is based on the combination of highly useful mechanical properties and advantages of economic thermoplast processing. By using different chemical starting components in varying quantity ratios, products can be prepared which are very different with respect to their processibility and their mechanical properties. An overview of TPU, its properties, and applications is found, for example, in: *Plastics* 68, 1978, pages 819–825, or in *The Plastics Handbook*, Volume 7, Polyurethanes, Second Edition, edited by Dr. G. Oertel, Carl-Hanser Publisher, Munich, Vienna, 1983.

TPU can be prepared continuously or batchwise according to different processes. The most well known is the conveyor process, but also industrially useful is the extruder process.

GB-A-10 57 018 discloses preparing a prepolymer from an essentially linear polyhydroxyl compound and excess organic diisocyanate which is fed via a metering pump into a mix head and is mixed there with a certain quantity of a lower molecular weight diol. The resulting reaction mixture is applied to a conveyor belt and fed into an oven heated to from 70°–130° C. until it hardens. Then the reaction product is reduced in size, stored 6 to 40 hours at temperatures up to 120° C., and in this form it can be processed, for example, into molded particles using injection molding machines. The post curing and size reduction steps are what increase costs for the conveyor process.

Following another process variation, a linear polyhydroxyl compound, a lower molecular weight diol and the organic diisocyanate can be fed into a mix head via separate lines, mixed there, and finally the reaction mixture obtained is applied onto a conveyor belt.

In an extruder process, for example in DE-A-20 59 570 (U.S. Pat. No. 3,642,964), the starting components are fed directly into the extruder and the reaction is carried out in the extruder under certain process conditions. The polyurethane elastomer formed is transferred into a thermoplastic state, extruded, cooled until hardened in an inert gas atmosphere, and reduced in size. A disadvantage to this process is that the TPU obtained, having Shore A hardnesses up to 95, is unsuitable for preparing films or delicate shapes and tubes. Moreover, such films often block and stick together so strongly that subsequent processing is impossible.

To overcome the aforesaid disadvantage, in EP-A-111 682 (CA 1 236 239) easily demoldable and non-blocking TPU is described which comprises 50 to 99.5 weight percent of a TPU (A) comprising 10 to 50 weight percent of urethane groups and having a melt index of 0.1 to 100 at 190° C., and from 0.5 to 50 weight percent of a TPU (B) comprising 20 to 60 weight percent of urethane groups and having a melt index of 10 to 1000 at 190° C., whereby the urethane group content of TPU (B) is always at least 10 weight percent greater than that of TPU (A), and the melt index of TPU (B) at a given melt temperature is equal to or greater than the melt index of TPU (A).

U.S. Pat. No. 3,284,539 discloses stable TPU molding compositions prepared by melting together a TPU having terminally positioned hydroxyl groups and a TPU having terminally positioned isocyanate groups. A disadvantage of these TPU molding compositions and the above mentioned non-blocking TPU's, particularly those having Shore A hardnesses greater than 95, is that they have an insufficient low temperature impact resistance and flowability is poor.

U.S. Pat. No. 4,129,611 discloses TPU molding compositions from rigid and flexible TPU which demonstrate insufficient solidification associated with insufficient low temperature impact resistance. This patent discloses flexible TPU prepared from organic polyisocyanates and higher molecular weight polyhydroxyl compounds or mixtures having average hydroxyl equivalent weights of at least 200 from higher molecular weight polyhydroxyl compounds and lower molecular weight chain extending agents; and rigid TPU prepared from organic polyisocyanates and compounds having reactive hydrogen atoms and an average hydroxyl equivalent less than 100, mixed in the melt or preferably in the form of a solution, for example, in dimethylformamide as a solvent.

SUMMARY OF THE INVENTION

The object of the present invention was to develop TPU compositions which did not have any of the above mentioned disadvantages and, while possessing excellent flowability, could be injection molded into extremely low temperature impact resistant molded articles.

This object was surprisingly met with TPU compositions based on a mixture of TPU's having different hardnesses and optionally reinforcing fillers wherein the TPU's are prepared by reacting:

a) organic, preferably aromatic diisocyanates with:
b) polyhydroxyl compounds, preferably essentially linear polyhydroxyl compounds, having molecular weights of 500 to 8,000; and
c) diols having molecular weights of from 60 to 400;

in an equivalent ratio of NCO groups from said organic diisocyanates; (a) to the total of the hydroxyl groups of components (b) and (c) from 1.0:1.0 to 1.2:1.0; wherein the TPU compositions comprise:

A) 5 to 95 parts by weight, more preferably 10 to 80 parts by weight, of a least one TPU (A) having a Shore A hardness less than 95, more preferably 95 to 60; and B) 95 to 5 parts by weight, more preferably 90 to 20 parts by weight, of at least one TPU (B) having a Shore A hardness greater than 98 more preferably a Shore A Hardness of 98 to a Shore D Hardness of 80;

whereby the parts by weight of TPU (A) and (B) total 100 parts by weight; and

C) 0 to 60 weight percent, more preferably 2 to 50 weight percent, based on the weight of TPU (A) and (B), of a reinforcing filler;

with the proviso that the flexible segments of TPU (A) and (B), either comprise both polyester segments or both polyether segments.

The subject of the instant invention is also a process for the preparation of said TPU compositions, whereby flexible TPU (A) and rigid TPU (B) are melted together at temperatures of from 140° to 250° C., optionally reinforcing fillers are added to the melt, this melt is allowed to cool, and then the solidified TPU composition is reduced in size and finally the TPU compositions are used to prepare preferably ski boots and injection molded articles for automobiles.

DESCRIPTION OF THE PREFERRED EMBODIMENTS

The TPU compositions of the present invention have a Shore A hardness of 90 to a Shore D hardness of 70, more preferably a Shore A hardness of 98 to a Shore D hardness of 68 and compared to conventional TPU's of an equal hardness demonstrate substantially better flowability which has a particular advantage in preparing large planar molded articles having complicated shapes using injection molding technology. Also noteworthy is the excellent low temperature impact resistance of the molded articles which strongly favors their use as automobile exterior parts. TPU (A) and (B) used according to the process of the present invention can be prepared by reacting at elevated temperatures: a) organic diisocyanates;

b) polyhydroxyl compounds having molecular weights of from 500 to 8,000; and c) diols as chain extending agents having molecular weights of from 60 to 400;

in the presence of:

d) catalysts; and optionally e) auxiliaries; and/or f) additives.

The following should be noted with respect to starting components ( a ) through ( d ) and optionally ( e ) and/or (f):

a) Typical examples of organic diisocyanates (a) are aliphatic, cycloaliphatic or preferably aromatic diisocyanates. Individual examples are: aliphatic diisocyanate like 1,6-hexamethylene diisocyanate, 2-methyl-1,5-pentamethylene diisocyanate, 2-ethyl-1,4-butylene diisocyanate or mixtures of at least two of the above mentioned aliphatic diisocyanates; cycloaliphatic diisocyanates such as isophorone diisocyanates, 1,4-cyclohexane diisocyanate, 1-methyl-2,4-cyclohexane diisocyanate and 1-methyl-2,6- cyclohexane diisocyanate as well as the corresponding isomeric mixtures 4,4'-, 2,4'- and 2,2'-dicyclohexylmethane diisocyanate as well as the corresponding isomeric mixtures; and preferably aromatic diisocyanate; such as 2,4-toluene diisocyanate, mixtures of 2,4- and 2,6- toluene diisocyanate, 4,4'-, 2,4'- and 2,2'-diphenylmethane diisocyanate, mixtures of 2,4'- and 4,4'-diphenylmethane diisocyanate, urethane modified liquid 4,4'- and/or 2,4'-diphenylmethane diisocyanate, 4,4'-diisocyanato-1,2-diphenylethane, mixtures of 4,4'-, 2,4'- and 2,2'-diisocyanato-1,2-diphenylethane preferably those comprising at least 95 weight percent of 4,4'-diisocyanato-1,2-diphenylmethane and 1,5-naphthalene diisocyanate. Preferably diphenylmethane diisocyanate isomeric mixtures are used comprising more than 96 weight percent of 4,4'-diphenylmethane diisocyanate and most preferably essentially pure 4,4'-diphenylmethane diisocyanate.

b) Preferably polyether polyols and most preferably polyester polyols are used as said higher molecular weight polyhydroxyl compounds (b) having molecular weights of front 500 to 8,000. However, also suitable are other hydroxyl group containing polymers having ether or ester groups as bridge members, for example, polyacetals such polyoxymethylenes or especially water insoluble formals, for example, polybutanediolformale and polyhexandiolformale and polycarbonates, particularly those from diphenylcarbonate and 1,6-hexanediols prepared by tranesterification. The polyhydroxyl compounds must at least be predominantly linear, i.e., difunctional in the sense of the isocyanate reaction. The above mentioned polyhydroxyl compounds can be used individually or in the form of mixtures.

Typical polyether polyols can be prepared according to known processes, for example, by the anionic polymerization with alkali hydroxides such as sodium or potassium hydroxide or alkali alcoholates such as sodium ethylate, sodium or potassium ethylate, or potassium isopropylate used as catalysts and while adding at least one initiator molecule which contains two to three, more preferably two reactive hydrogen atoms in bonded form, or by the cationic polymerization with Lewis acids such as antimony pentachloride, boron fluoride etherate, etc, or using bleaching earth as catalysts, from one or more alkylene oxides having 2 to 4 carbon atoms in the alkylene radical.

Typical alkylene oxides are preferably, for example, tetrahydrofuran, 1,3-propylene oxide, 1,2- and/or 2,3-butylene oxide and most preferable ethylene oxide and 1,2-propylene oxide. The alkylene oxides can be used individually alternating one after another or as mixtures. Examples of initiator molecules are, for example: water, organic dicarboxylic acids, such as succinic acid, adipic acid, and/or glutaric acid; alkanolamine such as, for example, ethanolamine, N-alkylalkonolamines, N-alkyldialkanolamines, such as, for example, N-methyl- and N-ethyl-diethanolamine and preferably divalent alcohols optionally containing ether bridges in bonded form such as, for example, ethanediol, 1,2- and 1,3-propanediol, 1,4-butanediol, diethylene glycol, 1,5-pentanediol, 1,6-hexanediol, dipropylene glycol, 2-methyl-1,5-pentanediol and 2-ethyl-1,4-butanediol. The initiator molecules can be used individually or as mixtures.

Preferably polyether polyols are used from 1,2-propylene oxide and ethylene oxide in which more than 50 percent, more preferably 60 to 80 percent, of the OH groups are primary hydroxyl groups and in which at least a portion of the ethylene oxide is arranged as a terminally positioned block. Such polyether polyols can also be prepared by first polymerizing the 1,2-propylene oxide onto the initiator molecule and subsequently polymerizing the ethylene oxide or first copolymerizing all of the 1,2-propylene oxides mixed with a portion of the ethylene oxide then subsequently polymerizing the remainder of the ethylene oxide, or stepwise first by polymerizing a portion of the ethylene oxide and all of the 1,2-propylene oxide and the remainder of the ethylene oxide on the initiator molecule.

Most preferably suited here are hydroxyl group containing polymerization products of tetrahydrofuran.

The essentially linear polyether polyols have molecular weights from 500 to 8,000 more preferably 600 to 6,000 most preferably 800 to 3500. They can be used individually or as mixtures with one another.

Typical polyester polyols can be prepared, for example, from dicarboxylic acids having 2 to 12 more preferable 4 to 6 carbon atoms and from multivalent alcohols. Typical dicarboxylic acids are: aliphatic dicarboxylic acids, such as, succinic acid, glutaric acid, adipic acid, subaric acid, azelaic acid, sebacic acid, and aromatic dicarboxylic acids, such as, phthalic acid, isophthalic acid and terephthalic acid. The dicarboxylic acids can be used individually or as mixtures, for example, in the form of a succinic acid, a glutaric acid and adipic acid mixture. When preparing the polyether polyols, it can also be advantageous in place of the carboxylic acids to use the corresponding carboxylic acids derivatives such as, for example, carboxylic acid esters having 1 to 4 carbon atoms in the alcohol radical, carboxylic acid anhydrydes or carboxylic acid chlorides. Typical multivalent alcohols are glycols having 2 to 10, more preferably 2 to 6 carbon atoms such as ethylene glycol, diethylene glycol, 1,4-butanediol, 1,5-pentanediol, 1,6-hexanediol, 1,10-decanediol, 2,2-dimethyl-1,3-propanediol, 1,3,propanediol and dipropylene glycol. Depending on the desired properties, the multivalent alcohols can be used alone or optionally mixed with one another.

Also suitable are esters of carboxylic acids with the aforementioned diols particularly those having 4 to 6 carbon atoms such as 1,4-butanediol and/or 1,6-hexanediol; condensation products of 1-hydroxycarboxylic acids, for example, 1-hydroxycaproic acid, and preferably polymerization products of lactones, for example, optionally substituted 1-caprolactones. Preferably used as polyester polyols are: ethanediol polyadipates, 1,4-butanediol polyadipates, ethanediol 1,4-butanediol polyadipates, 1,6-hexanediol neopentylglycol polyadipate, 1,6-hexanediol, 1,4-butanediol polyadipates, and polycaprolactones.

The polyester polyols have molecular weights of from 500 to 6,000, more preferably 800 to 3,500.

c) The chain extending agents (c) have molecular weights of from 60 to 400, more preferably 60 to 300, are preferably aliphatic diols having 2 to 12 carbon atoms more preferably 2, 4, or 6 carbon atoms such as, for example, ethanediol, 1,6-hexanediol, diethylene glycol, dipropylene glycol and most preferably 1,4-butanediol. However, also suitable are diesters of terephthalic acids with glycols having 2 to 4 carbon atoms such as, for example, terephthalic acid-hisethylene glycol or terephthalic acid 1,4-butanediol and hydroxyalkylene ethers of hydroquinone such as, for example, 1,4-di-(b-hydroxyethyl)-hydroquinone.

To adjust the hardness and melt index, the starting components can be varied in relatively broad molar ratios whereby the hardness and melt viscosity increases with an increasing content of chain extending agent (c) while the melt index decreases.

When preparing the flexible TPU (A) having a Shore A hardness of less than 95, the essentially difunctional polyhydroxyl compounds (b) and diols (c) are used advantageously in mole ratios of 1:1 to 1:5, more preferably 1:1.5 to 1:4.5 so that the resulting mixture of (b) and (c) has a hydroxyl equivalent weight greater than 200 and most preferably 230 to 450, while when preparing the rigid TPU (B) having a Shore A hardness of greater than 98 the mole ratio of (b):(c) lies in a range of 1:5.5 to 1:15, more preferably 1:6 to 1:12 so that the resulting mixture of (b) and (c) has a hydroxyl equivalent weight of 110 to 200, more preferably 120 to 180.

d) Typical catalysts which accelerate the reaction between the NCO groups of the diisocyanates (a) and the hydroxyl groups of starting components of (b) and (c) are state of the art catalysts and conventional tertiary amines such as, for example, triethylamine, dimethylcyclohexylamine, N-methylmorpholine, N,N'-dimethylpiperazine, diazabicyclo[2.2.2]-octane and the like, as well as most preferably organic metal compounds such titanium acid ester, iron compounds, tin compounds such as tin diacetate, tin dioctoate, tin dilaurate, or tin dialkyl salts of aliphatic carboxylic acids such as, for example, dibutyltin acetate, dibutyltin dilaurate or the like. The catalysts are generally used in quantities of from 0.001 to 0.1 parts by weight per 100 parts by weight of the mixture of polyhydroxyl compounds (b) and diols (c).

Auxiliaries (e) and/or additives {f) can also be added to the starting components along with the catalysts. Typical examples are: lubricants, inhibitors, stabilizers protecting against hydrolysis, light, heat, or discoloration, flame retardants, colorants, pigments, inorganic and/or organic fillers and reinforcing agents.

The auxiliaries (e) and/or additives (f) previously cited can be incorporated into the starting components or into the reaction mixture to prepare TPU (A) and/or (B). According to a preferred process the auxiliaries and/or additives, particularly reinforcing fillers, are mixed with TPU (A) and TPU (B) then melted or most preferably directly incorporated into the melt of TPU (A) and (B).

Additional information on auxiliaries and/or additives can be found if needed in the technical literature, for example, in the monograph of J. H. Saunders and K. C. Frisch *High Polymers*, Vol. XVI, Polyurethanes, Parts 1 and 2, Interscience Publishers 1962 and 1964 or in *The Plastics Handbook*, Vol. 7, Polyurethanes, First and Second Editions, Carl Hanser Publishers, 1966 and 1983 or in DE-OS 29 01 774.

When preparing the TPU, starting components (a), (b), and (c) are reacted in the presence of catalysts (d) and optionally auxiliaries (e) and/or additives (f) in such quantities so that the equivalent ratio of NCO groups of the diisocyanates to the total of the hydroxyl groups from the (b) and (c) components is from 1.00 to 1.20:1, more preferably 1.00 to 1.05:1 and most preferably 1.00 to 1.025:1.

The flexible TPU (A) used according to the present invention has a Shore A hardness less than 95, typically comprises 10 to 60 weight percent, more preferably 15 to 40 weight percent, based on the total weight, of urethane groups in bonded form, and has a melt index at 190° C. of from 0.1 to 100, more preferably 1 to 80. TPU (A) can be prepared using an extruder or preferably using a conveyor process batchwise or continuously by mixing starting components (a) through (d) and optionally (e) and/or (f); then allowing the reaction mixture to cure in the extruder or on the conveyor belt at temperatures of from 60° to 250° C. more preferably 70° to 150° C. and finally granulating the resulting TPU (A). In addition, it also can be useful to temper the resulting TPU (A) before subsequent processing into TPU compositions at 80° to 120° C., more preferably 100° to 110° C., over a time period of 1 to 24 hours.

The rigid TPU (B) used according to the present invention has a Shore A hardness greater than 98, and normally comprises 45 to 75 weight percent, more preferably 50 to 75 weight percent, TPU (B) is preferably prepared according to a conveyor process. Here the starting components (a) through (d) and optionally (e) and/or (f) are continuously mixed at temperatures above the melting point of starting components (a) through (c) with the help of a mix head. The reaction mixture is applied onto a carrier preferably a conveyor belt, for example, made of metal and fed at a rate of 1 to 20 meters per minute, more preferably 4 to 10 meters per minute, through a heating zone 1 to 20 meters in length, more preferably 3 to 10 meters in length. The reaction temperature in the heating zone is 60° to 200° C., more preferably 100° to 180° C. Depending on the isocyanate fraction in the reaction mixture, the reaction is controlled by cooling or heating so that at least 90 percent, more preferably at least 98 percent, of the isocyanate groups of the diisocyanates react and the reaction mixture cures at the desired reaction temperature. Because of the free isocyanate groups in the hardened reaction product, which based on the total weight lie in a range of from 0.05 to 1 weight percent, more preferably 0.1 to 0.5 weight percent, the rigid TPU (B) obtained has a very low melt viscosity and/or a high melt index.

When preparing the novel TPU compositions of the present invention, it is essential than only TPU (A) and (B) are melted together which comprise either both polyester flexible segments or both polyether flexible segments in bonded form, since only such combinations will generate homogeneous TPU compositions.

Along with the novel TPU (A) and (B) components of the present invention, said TPU compositions can also contain reinforcing fillers. The portion of this (C) component generally is 0 to 60 weight percent, more preferably 2 to 50 weight percent and most preferably 5 to 40 weight percent based on the total weight of TPU (A) and (B).

Typical fillers are, for example, organic fillers such as carbon black, chlorinated polyethylenes and melamines, and inorganic fillers such as, for example, wollastonite, calcium carbonate, magnesium carbonate, amorphous silicic acid, calcium silicate, calcium metasilicate, quartz powder, talc, kaolin, mica, feldspar, glass spheres, silicon nitride or boron nitride as well as mixtures of these fillers.

Fibers, for example, carbon fibers or most preferably glass fibers, have proven useful as reinforcing agents and thus are preferably used when a high heat dimensional' stability is required. Moreover, the fibers can be coated with finishes and/or sizing. Other typical glass fibers are, for example, those in the form of wovens, mats, fleece, and/or preferably glass rovings or cut glass fibers from low-alkali E-fibers having a diameter from 5 to 200 microns, more preferably 6 to 15 microns, however, after their incorporation into the TPU composition they generally have an average fiber length of 0.05 to 1 mm, more preferably 0.1 to 0.5 min.

As previously stated, auxiliaries and/or additives can be added to said TPU compositions or to TPU (A) and/or TPU (B) suitable therefor. If such materials are used, then their share, based on the total weight of TPU (A) and (B), generally is up to 20 weight percent, more preferably up to 10 weight percent and most preferably 0.01 to 5 weight percent.

Individual examples are: flame retardants such as, for example, melamine, polyhalide diphenyl, polyhalide diphenylether, polyhalide phthalic acid and its derivatives, polyhalide oligo-carbonates and polyhalide polycarbonates whereby the corresponding bromine compounds are particularly effective. Phosphorus compounds are also suitable as flame retardants such as elemental phosphorus or organic phosphorus compounds. In addition, the flame retardants generally contain a synergist, for example, antimony trioxide.

Typical nucleating agents are, for example, talc, calcium fluoride, sodium phenylphosphonate, aluminum oxide and finely divided polytetrafluoroethylene in quantities of up to 5 weight percent based on the total weight of TPU (A) and (B).

Suitable oxidation retarding agents and heat stabilizers which can be added to the TPU compositions are, for example, sterically hindered phenols, hydroquinone, substituted compounds of these groups, and mixtures thereof, which preferably are used in concentrations up to 1 weight percent based on the weight of TPU (A) and (B).

Examples of UV stabilizers are different substituted resortins, salicylates, benzotriazoles and benzophenones as well as sterically hindered amines which generally are used in quantities in up to 2.0 weight percent based on the weight percent of TPU (A) and (B).

Release and demold agents, which are generally used in quantities up to 1 weight percent, based on the weight of TPU (A) and (B), are stearic acids, stearyl alcohol, stearic acid ester, and stearic acid amides as well as the fatty acid ester of pentaerythritol.

In addition, organic dyes such as nigrosine, or pigments, for example, titanium dioxide, calcium sulfide, calcium sulfide oxide, calcium sulfide selenide, phthalocyanines, Ultramarine blue or carbon black can be added.

The TPU compositions of the present invention can be prepared following any known process which provides essentially homogeneous compositions from TPU's (A) and (B) and optionally reinforcing filler (C). For example components TPU (A), TPU (B) and (C) can be mixed at temperatures of from 0° to 150° C., more preferably 15° to 30° C. and then melted together, or the components can be mixed together in the melt. Following another process variation TPU (A) can be mixed (C) or TPU (B) can be mixed with (C) then these mixtures are incorporated into either TPU (B) and/or TPU (A) respectively.

The preparation of the TPU compositions of the present invention is done in a temperature range of from 140° to 250° C., more preferably 190° to 240° C. and with a residency time of 0.5 to 10 minutes, more preferably 0.5 to 3 minutes, in, for example, a flowable, softened or preferably molten state of TPU (A) and TPU (B), for example, by stirring, milling, kneading, or preferably extruding, for example, while using ordinary plastification equipment such as, for example, Brabender or Banburg mills, kneaders and extruders preferably a double screw extruder or a transfer molding mix extruder.

According to the most practical and therefore the preferably used preparation process, TPU (A) and (B) are mixed at a temperature of 140° to 250° C., preferably in an extruder, melted together, optionally the component is added to the melt, this is allowed to cool, and then the resulting TPU composition is reduced in size.

The TPU compositions of the present invention can be easily processed into molded articles having good surface consistency and improved impact resistance with a high strength particularly at low temperatures.

In addition, TPU (A) and (B) do not separate either in the melt nor in the molded article.

The compositions are preferably used for the preparation of molded articles most preferably ski boots and large planar injection molded parts for automobiles especially automobile exterior parts such as, for example, bumpers, front aprons, rear spoilers, and side impact edging. They are also suitable for molded articles in the interior of the vehicle such as, for example, console coverings, arm rests and handles.

Examples

Preparation of flexible TPU (A)

Example 1

1000 g ( 0.497 moles ) of a poly-1,4-butanediol adipate having a molecular weight of about 2000 (OH number 56.1 ); and 82.3 g (0.913 moles) of 1,4-butanediol were mixed at 75° C. Incorporated into the resulting mixture having a hydroxyl equivalent weight of 384, while vigorously stirring at 75° C. was:

360 g (1.44 moles) of 4,4'-diphenylmethane diisocyanate, corresponding to a NCO/OH equivalent ratio of 1.02:1.

The reaction mixture was poured onto a metal pan heated to 150° C. and at this temperature the reaction ended in 15 minutes. The layer of thickness was 0.5 cm. The reaction product, which was left to solidify for 24 hours at 80° C., was subsequently granulated. The resulting TPU (A) had a Shore A hardness of 80.

Examples 2 through 6

The procedure in Example 1 was followed, however, the starting components and quantities listed in Table 1 were used.

TABLE I

| Example | Type of Polyhydroxyl Compound | Quantity [g] | Quantity [moles] | BuOH [g] | BuOH [moles] | OH equivalent | 4,4'-MDI [g] | 4,4'-MDI [moles] | NCO-Index | TPU-(A) Shore A Hardness |
|---|---|---|---|---|---|---|---|---|---|---|
| 2 | Poly-1,4-butanediol-adipate (molecular weight about 2000; hydroxyl number 56.1) | 1000 | 0.497 | 68.0 | 0.755 | 427 | 320 | 1.28 | 1.02 | 75 |
| 3 | Poly-1,4-butanediol-adipate (molecular weight about 2000; hydroxyl number 56.1) | 1000 | 0.497 | 160 | 1.78 | 255 | 580 | 2.32 | 1.02 | 92 |
| 4 | Poly-(ethylene glycol-1,4-butanediol)-adipate (Molecular weight about 2000, hydroxyl number 56.3, ethylene glycol 1,4-butanediol ratio 1:1) | 1000 | 0.499 | 78.5 | 0.871 | 394 | 350 | 1.40 | 1.02 | 80 |
| 5 | Poly-1,4-butanediol-1,6-hexanediol-adipate (Molecular weight about 2000, hydroxyl number 56.0) | 1000 | 0.497 | 77 | 0.854 | 398 | 345 | 1.38 | 1.02 | 78 |
| 6 | Polyoxytetrametylene glycol (molecualr weight about 1300, hydroxyl number 86 | 1000 | 0.763 | 86.5 | 0.960 | 315 | 440 | 1.76 | 1.02 | 80 |

The following abbreviations are used in Table I:
BuOH: 1,4-butanediol
4,4'-MDI: 4,4'-diphenylmethane diisocyanate
OH-equivalent: the hydroxyl equivalent weight of a mixture of a polyhydroxyl compound and 1,4-butanediol
NCO Index: equivalent ratio of NCO groups to the total of the OH groups.

Preparation of rigid TPU (B)

Example 7

1000 g (0.497 moles) of a poly-1,4-butanediol adipate having a molecular weight of about 2000 (OH number 56.1) and 528 g (5.86 moles) of 1,4-butanediol were mixed at 75° C. Incorporated into the resulting mixture having a hydroxyl equivalent weight of 120 while intensively stirring at 75° C. was: 160.0 g (6.39 moles) of 4,4'-diphenylmethane diisocyanate corresponding to a NCO/OH equivalent ratio of 1.005:1. The reaction mixture was poured onto a metal pan heated to 170° C. in a 0.5 cm thickness layer and the reaction ended within 15 minutes.

The reaction product, which was allowed to solidify over the course of 24 hours at 80° C., was subsequently granulated. The resulting TPU (B) had a Shore D hardness of 74 and contained 0.23 weight percent of free NCO groups based on the total weight.

Example 8 through 12

The procedure in Example 7 was followed, however, the starting materials and quantities listed in Table II were used.

TABLE II

| Example | Type of polyhydroxyl compound | Quantity [g] | Quantity [moles] | BuOH [g] | BuOH [moles] | OH equivalent | 4,4'-MDI [g] | 4,4'-MDI [moles] | NCO Index | TPU (A) NCO-content [wt. %] | TPU (A) Shore Hardness |
|---|---|---|---|---|---|---|---|---|---|---|---|
| 8 | Poly-(ethylene glycol 1,4-butanediol) adipate (molecular weight about 2000, hydroxyl number 56.5, ethylene glycol/1,4-butanediol ratio 1:1) | 1000 | 0.501 | 510 | 5.66 | 123 | 1550 | 6.19 | 1.055 | 0.15 | D 74 |
| 9 | Poly-(1,4-butanediol 1,6-hexanediol) adipate (molecular | 1000 | 0.497 | 529 | 5.87 | 120 | 1600 | 6.39 | 1.005 | 0.16 | D 74 |

TABLE II-continued

| Example | Type of polyhydroxyl compound | Quantity [g] | Quantity [moles] | BuOH [g] | BuOH [moles] | OH equivalent | 4,4'-MDI [g] | 4,4'-MDI [moles] | NCO-Index | TPU (A) NCO-content [wt. %] | TPU (A) Shore Hardness |
|---|---|---|---|---|---|---|---|---|---|---|---|
| | weight about 2000, hydroxyl nubmer 56.1,1,4-butanediol/hexanediol ratio 1:2) | | | | | | | | | | |
| 10 | Poly-1,4-butanediol adipate (molecular weight about 2000, hydroxyl number 56.1) | 1000 | 0.497 | 349 | 3.87 | 154 | 1100 | 4.40 | 1.005 | 0.14 | D 64 |
| 11 | Poly-1,4-butanediol adipate (molecular weight about 2000, hydroxyl number 56.1) | 1000 | 0.497 | 278 | 3.08 | 178 | 900 | 3.60 | 1.005 | 0.15 | D 60 |
| 12 | Polyoxytetramethylene glycol (molecular weight about 1000, hydroxyl number 112.2) | 1000 | 0.995 | 556 | 6.17 | 109 | 1800 | 7.19 | 1.003 | 0.18 | D 74 |

The abbreviations previously cited in Table I were also used in Table II.

Preparation of the TPU Compositions

Examples 13 through 23 and comparison examples I through III

In the preparation of the TPU compositions, TPU (A) and TPU (B) were mixed in their granular form at 25° C., the mixture was fed into a double screw extruder, melted in the extruder at 230° C. and homogenized. Glass fibers in the form of cut fibers, or rovings, were incorporated into the homogenized melt.

The resulting melt was extruded into a water bath then granulated and dried.

Test articles were made from the granulated TPU compositions using an injection molding machine at 230° C. and without subsequent post treatment, the mechanical properties of the test articles were measured.

Table III illustrates the type and quantity of different TPU's (A) and (B) used in addition to the mechanical properties measured on the test articles.

We reported the notched bar impact strength according to DIN 53 453, the modulus of elasticity according to DIN 53 457, the hardness and the melt index (MFI) with a bearing weight of 21.6 kg.

optionally reinforcing fillers wherein the thermoplastic polyurethane elastomers are prepared by reacting:
a) organic diisocyanates with:
b) polyhydroxyl compounds having molecular weights of from 500 to 8,000; and
c) diols having molecular weights of from 60 to 400 in an equivalent ratio of NCO groups from said organic diisocyanates (a) to the total of the hydroxyl groups from said components (b) and (c) of from 1.0:1.0 to 1.2:1.0 wherein the thermoplastic polyurethane elastomer compositions comprise:
A) 5 to 95 parts by weight of at least one thermoplastic polyurethane elastomer (A) having a Shore A hardness of less than 95 wherein components b) and c) taken together have an average hydroxyl equivalent weight of greater than about 200;
B) 95 to 5 parts by weight of at least one Shore A hardness of greater than 98 whereby the parts by weight of (A) and (B) total 100 parts by weight wherein components b) and c) taken together have an average hydroxyl equivalent weight of from 110 to about 200; and
C) 0 to 60 weight percent based on the weight of (A)

TABLE III

| | Starting Materials | | | | Mechanical properties of the TPU compositions | | | | | | |
|---|---|---|---|---|---|---|---|---|---|---|---|
| | TPU [A] Quantity [parts by weight] | Type [per example] | TPU [B] Quantity [parts by weight] | Type [per example] | Modulus of Elasticity [N/mm²] | Notched bar Impact Strength [kJ/m²] −20° C. | −30° C. | −40° C. | Shore Hardness | MFI [g/10 Min] | At a Mass Temp. of [°C.] |
| Example | | | | | | | | | | | |
| 13 | 35 | 5 | 65 | 7 | 320 | 19 | 6.8 | 4.3 | D 60 | 100 | 215 |
| 14 | 35 | 5 | 65 | 8 | 340 | 17 | 5.6 | 4.0 | D 61 | 110 | 215 |
| 15 | 25 | 5 | 75 | 8 | 410 | 12 | 4.3 | 3.8 | D 64 | 60 | 215 |
| 16 | 35 | 5 | 65 | 9 | 280 | 25 | 9.2 | 6.1 | D 59 | 50 | 210 |
| 17 | 60 | 1 | 40 | 10 | 75 | o.Br* | o.Br. | 15 | A 92 | 60 | 205 |
| 18 | 50 | 1 | 50 | 11 | 100 | o.Br. | o.Br. | 12 | A 93 | 55 | 205 |
| 19 | 50 | 2 | 50 | 11 | 45 | o.Br. | o.Br. | 20 | A 90 | 100 | 205 |
| 20 | 50 | 3 | 50 | 10 | 205 | o.Br. | 14 | 6.8 | A 56 | 40 | 210 |
| 21 | 35 | 4 | 65 | 8 | 360 | 15 | 5.9 | 4.1 | D 62 | 80 | 215 |
| 22 | 25 | 6 | 75 | 12 | 280 | o.Br. | 15 | 8.3 | D 64 | 90 | 210 |
| 23 | 20 | 6 | 80 | 12 | 320 | 41 | 12 | 7.5 | D 66 | 70 | 210 |
| Comparison Example | | | | | | | | | | | |
| I | 100 | 3 | — | — | 80 | o.Br. | 18 | 5.8 | A 92 | 70 | 215 |
| II | — | — | 100 | 10 | 400 | 5.6 | 2.5 | 2.4 | D 64 | 40 | 220 |
| III | — | — | 100 | 11 | 300 | 11 | 3.9 | 2.6 | D 60 | 55 | 220 |

*o.Br. = Without Break

We claim:

1. Low temperature impact resistant, easily flowing, thermoplastic polyurethane elastomer compositions, comprising a mixture of thermoplastic multiblock polyurethane elastomers having different hardnesses and (B) of reinforcing filler; with the proviso that the flexible segment of the thermoplastic polyurethane elastomer (A) and (B) comprises either both polyester segments or both polyether segments.

2. The low temperature impact resistant, easily flowing thermoplastic polyurethane elastomer compositions of claim 1 wherein said thermoplastic polyurethane elastomer (A) has a Shore A hardness from about 60 to 95, and said thermoplastic polyurethane elastomer (B) has a Shore A hardness of 98 to a Shore D hardness of 80.

3. The lower temperature impact resistant, easily flowing thermoplastic polyurethane elastomer compositions of claim 1 wherein said compositions have a Shore A hardness of 90 to a Shore D hardness of 70.

4. The low temperature resistant, easily flowing thermoplastic polyurethane elastomer compositions of claim 1 wherein said organic diisocyanate is 4,4'-diphenylmethane diisocyanate.

5. The low temperature impact resistant, easily flowing thermoplastic polyurethane elastomer compositions of claim 1 wherein polyurethane elastomers (A) and (B) are prepared by reacting:
a) 4,4'-diphenylmethane diisocyanate, with
b) polyalkylene glycol polyadipates having 2 to 6 carbon atoms in the alkylene radical and having molecular weights of from 500 to 6,000, or hydroxyl group containing polytetrahydrofuran having a molecular weight of from 500 to 8,000; and
c) 1,4-butanediol.

6. The low temperature impact resistant, easily flowing thermoplastic polyurethane elastomer compositions of claim 1 wherein said polyurethene elastomer (B) is prepared according to a conveyor process.

7. The low temperature impact resistant, easily flowing thermoplastic polyurethane elastomer compositions according to claim 1 wherein said polyurethane elastomer (B) comprises from 0.05 to 1 weight percent of free isocyanate groups, based on the total weight.

8. A process for the preparation of low temperature impact resistant, easily flowing, thermoplastic polyurethane elastomer compositions of claim 1, comprising melting said polyurethane elastomers (A) and (B) at temperatures of from 140° to 250° C.; allowing the mixture to cool; and reducing in size the solidified elastomer composition.

9. The process of claim 8 wherein said melting takes place in an extruder.

10. The process of claim 8 wherein one or more reinforcing fillers are added to the melt.

11. The process of claim 9 wherein one or more reinforcing fillers are added to the extruder.

12. A thermoplastic polyurethane article containing the polyurethane elastomer prepared by the process of claim 1.

* * * * *